Patented Sept. 4, 1928.

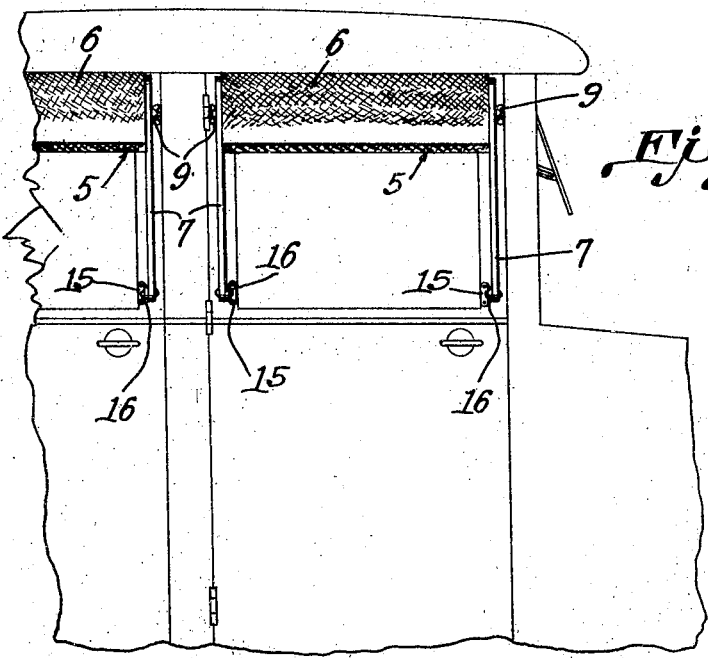
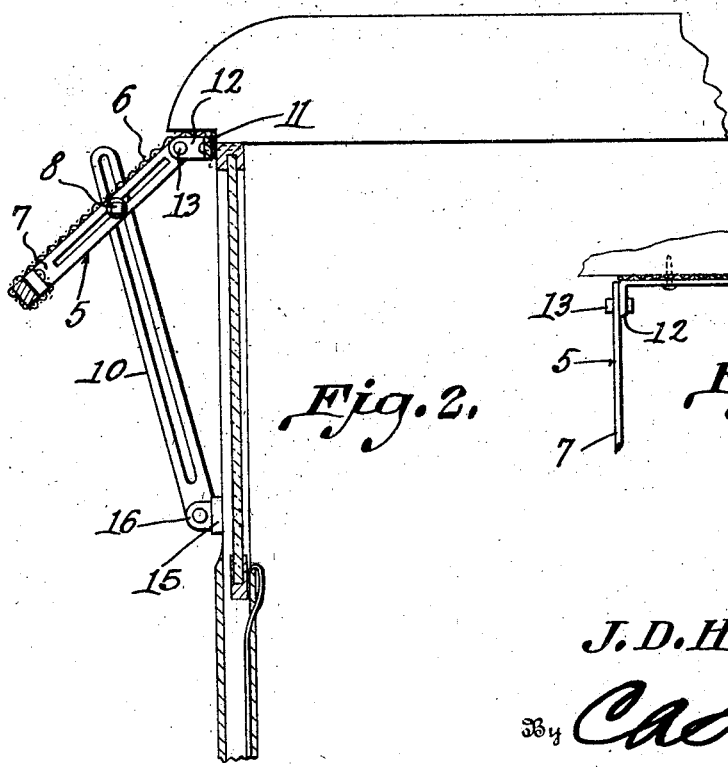
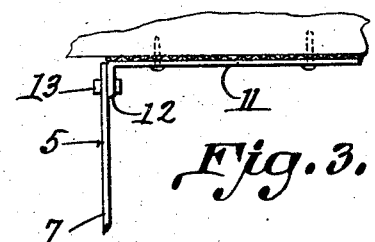

1,683,186

UNITED STATES PATENT OFFICE.

JOSEPH DE WITT HIRES, OF LUXORA, ARKANSAS, ASSIGNOR TO HIRES AUTO AWNING COMPANY, INCORPORATED, OF BLYTHEVILLE, ARKANSAS.

SUN SHIELD.

Application filed September 14, 1925. Serial No. 56,343.

This invention relates to a sun or rain shield, especially designed for use in connection with the windows and doors of motor vehicles to protect the occupants of the motor vehicles equipped with the shields from rain or the direct sun rays, the construction being such as to exclude rain and sun while the windows are in their open positions.

Another important object of the invention is to provide an adjustable device of this character which may be moved to various positions for the comfort of the occupants of the car.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a fragmental elevational view of a sun shield positioned on the body of a motor vehicle.

Figure 2 is a sectional view therethrough.

Figure 3 is a fragmental front elevational view of the shield securing means.

Referring to the drawing in detail, the device includes a frame indicated generally by the reference character 5, which body portion is in the form of a frame over which a canvas covering 6 is stretched and secured in any usual and well known manner.

Forming a part of the frame 5 are the side members 7 which are provided with elongated openings disposed throughout the lengths thereof, which openings accommodate the bolts 8 that are provided with winged nuts 9 that may be operated to clamp the adjusting arms 10 to the side members 7.

A securing bar 11 is secured to the upper portion of the usual door or window frame as shown by Figs. 2 and 3 and is provided with ears 12 disposed at its ends, which ears 12 are formed with openings to accommodate the pins 13 carried by the end members 7, whereby the end members 7 are pivotally connected to the bar 11.

The adjusting arms 10 are also provided with elongated openings that accommodate the bolts 8 so that the bolts may move longitudinally of the arms 10 to facilitate the adjustment of the shield proper. At the lower ends of the arms 10 are securing members 15 that may be secured to the frame of the usual door or window in any well known manner, the securing members having ears 16 to which the arms 10 are pivotally connected.

From the foregoing it will be obvious that due to the construction as shown and described, the sun shield may be moved to various angles with respect to its support, for the comfort of the occupants of the car.

I claim:—

In an awning structure, a bar having right angled ends formed with openings, said bar adapted to be secured adjacent to a window, a wide mesh member secured between the bar and window, side members, pins extending through the end portions of the bar and side members to pivotally connect the side members to the bar, said side members having elongated openings, a bar connecting the free ends of the side members, said wire mesh member being stretched over the bar, adjusting arms pivotally supported adjacent to the side of the window and having elongated openings, bolts extending through the side members and adjusting arms to adjustably connect the adjusting arms and side members.

In testimony that I claim the foregoing as my own I have hereto affixed my signature.

JOSEPH DE WITT HIRES.